United States Patent
Guthrie et al.

(10) Patent No.: US 6,361,264 B1
(45) Date of Patent: Mar. 26, 2002

(54) CONTAINER TRANSPORTER

(76) Inventors: Shawn Allen Guthrie, 257 Oakdale Ter., Hot Springs, AR (US) 71913; Tommy Lee Buffington, 394 Wandering Way, Mountain Pine, AR (US) 71956; Arthur L. Tucker, 224 Pepper La., Lonsdale, AR (US) 72087

( * ) Notice: Subject to any disclaimer, the term of this patent is extended or adjusted under 35 U.S.C. 154(b) by 0 days.

(21) Appl. No.: 09/714,591

(22) Filed: Nov. 17, 2000

(51) Int. Cl.⁷ ................................................. B60R 9/00
(52) U.S. Cl. ....................................... 414/462; 224/521
(58) Field of Search ............................... 224/518, 519, 224/520, 521; 414/427, 462

(56) References Cited

U.S. PATENT DOCUMENTS

| | | | | |
|---|---|---|---|---|
| 4,932,829 A | * | 6/1990 | Miller | 414/462 |
| 5,366,338 A | * | 11/1994 | Mortensen | 414/462 X |
| 6,033,178 A | * | 3/2000 | Cummins | 414/462 |
| 6,164,896 A | * | 12/2000 | Cummins | 414/462 |

* cited by examiner

*Primary Examiner*—Janice L. Krizek
(74) *Attorney, Agent, or Firm*—Dennis B. Haase

(57) ABSTRACT

A transporter which is attachable to the tow package of a vehicle for transporting a container from one place to another. The transporter includes a lifter which manually engages, lifts and holds the container for transportation.

5 Claims, 3 Drawing Sheets

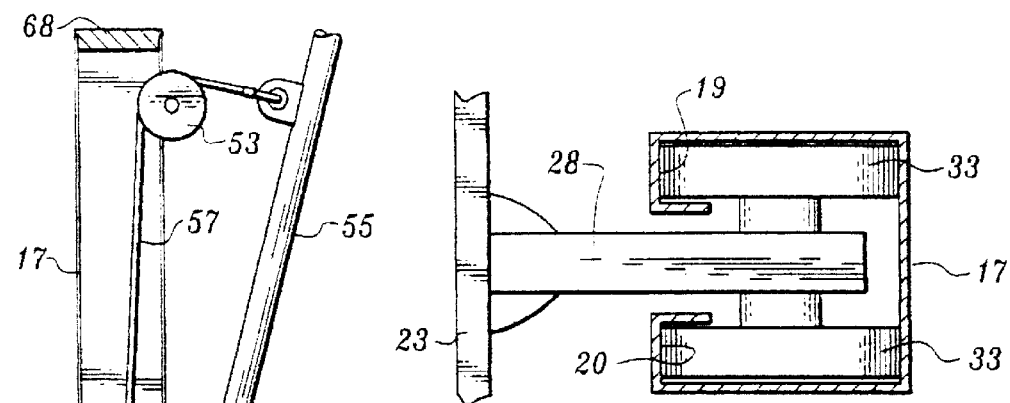
Fig. 5
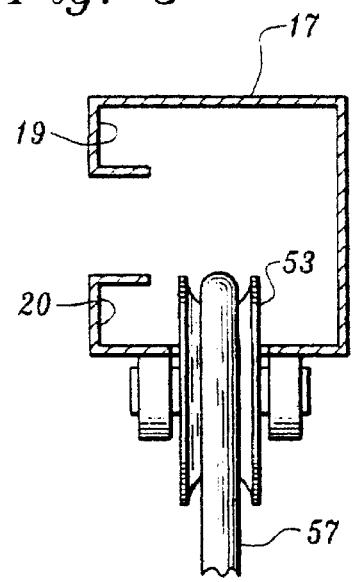
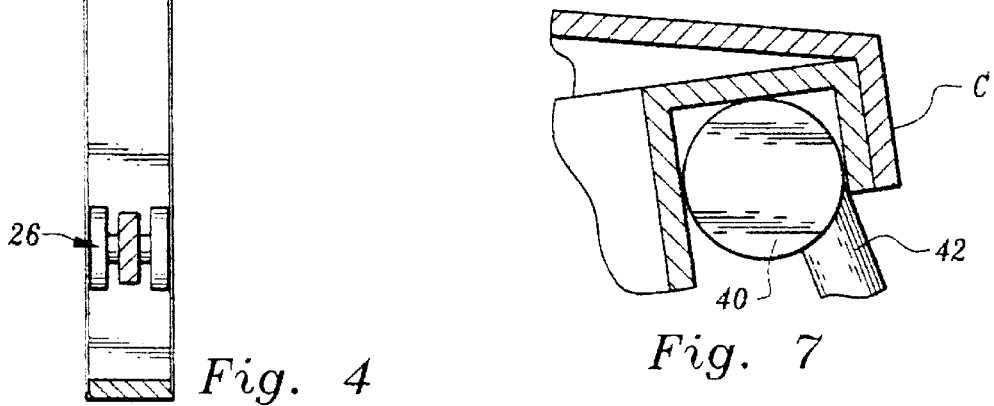
Fig. 4
Fig. 6
Fig. 7

CONTAINER TRANSPORTER

The present invention relates generally to a device for lifting and transporting containers and is particularly concerned with such implements or devices which are an accessory to a motor vehicle and which is capable of lifting and transporting containers intended to hold trash.

BACKGROUND OF THE INVENTION

1. Field of the Invention

Throughout the United States there are a large number of sparsely populated areas and areas where housing is a considerable distance away from a country or other road.

It has become increasingly common practice to service the solid waste needs of such residents by distributing containers for storage of such solid waste materials and to designate "pick up" areas where the residents can position their containers for eventual disposal of solid waste by the county, municipality, or other entities, such as private contract haulers.

Such containers are often 30 gallons or more, and, when full, they are very heavy. By virtue of their size, they are cumbersome, and even when equipped with wheels, they are difficult to move from a home, perhaps down a dirt road, path or worse, to a collection point on the main road, which may be a mile or more away.

By virtue of the automation of the trash hauler vehicles, most containers now have the same of similar construction. Thus, the hauler with a pickup device similar to a fork lift, can hoist the container, irrespective of its weight, and dump the contents into the bin positioned on the bed of the truck. However, these trucks are heavy and bulky, and they will not, typically, drive back in to sparsely populated areas, on poor roads, to pick up one or two containers of solid waste. Thus, the need for designated pickup points which require the resident to somehow get his or her container to that point, or forego pickup entirely. The dilemma is, therefore, how a resident in such remote areas gets his or her container of solid waste overland to the designated pickup point.

2. Overview of the Prior Art

While the art is proliferate with little carts, and even golf carts, they still require that the container be lifted, and, by virtue of the size of the wheels, such devices are almost impossible to maneuver over grassy paths and/or rut ridden gravely roads.

The specific problem was addressed, however, in Cummins U.S. Pat. No. 6,033,178. Cummins envisioned a frame which was mountable on the tail gate of a truck and which used a series of high energy springs to assist the user in his or her effort to hoist a container off the ground for transportation to a pickup point.

The Cummins device, while capable of doing the task, is cumbersome, somewhat dangerous to the extent springs can be dangerous, and it employs a well known four bar mechanism to effect lifting, and little fingers, and even big fingers, can inadvertently get pinched in any number of readily accessible places.

SUMMARY OF THE INVENTION

The present invention relates to an accessory for a vehicle having a tow package which, when mounted to the vehicle by the tow bar, is capable of lifting and transporting a container.

It is, therefore, a principal objective of the present invention to provide to residents in remote areas an easy and convenient means of lifting and transporting their solid waste containers to and from a pickup point.

It is another objective of the present invention to provide a device for lifting and transporting a container which is environmentally safe to use.

These and other objects and advantages of the present invention will become apparent from a reading of the Detailed Description of a Preferred Embodiment, in conjunction with the drawing, wherein:

DESCRIPTION OF THE FIGURES OF THE DRAWINGS

FIG. 4 is a view of the device of the present invention with the central post being sectioned to illustrate the internal mechanism;

FIG. 5 is a view of the device of the present invention taken along lines 5—5 of FIG. 3, with the upstanding post sectioned;

FIG. 6 is a view similar to FIG. 5, taken along lines 6—6 of FIG. 3;

FIG. 7 is a view, partially sectioned, taken along lines 7—7 of FIG. 1; and,

DETAILED DESCRIPTION OF A PREFERRED EMBODIMENT

Figure 1:
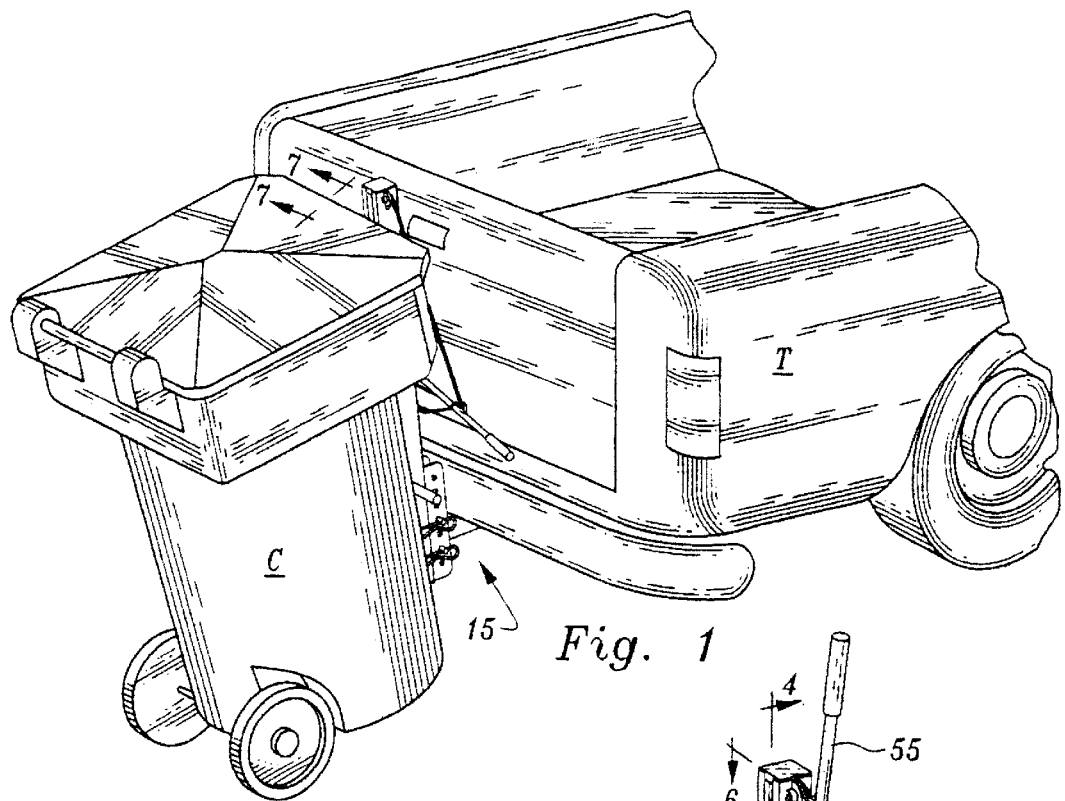
FIG. 1 is a pictorial representation of the environment in which the device of the present invention has particular utility, and, in so doing, the bed of a truck equipped with a tow package is shown with the device in place and with a container secured thereto.
Figure 2:
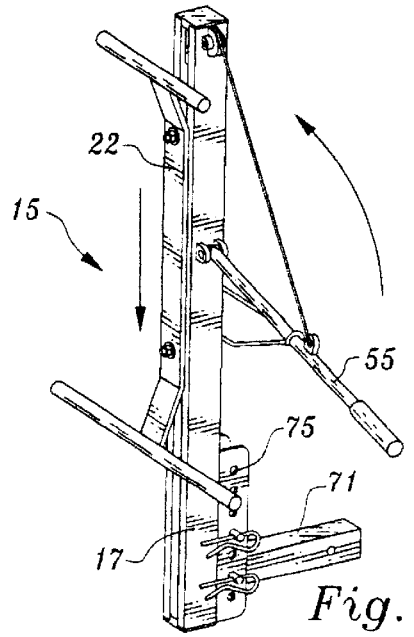
FIG. 2 is a perspective view of the device of the present invention shown as the container engaging mechanism is being lowered to receive a container.
Figure 3:
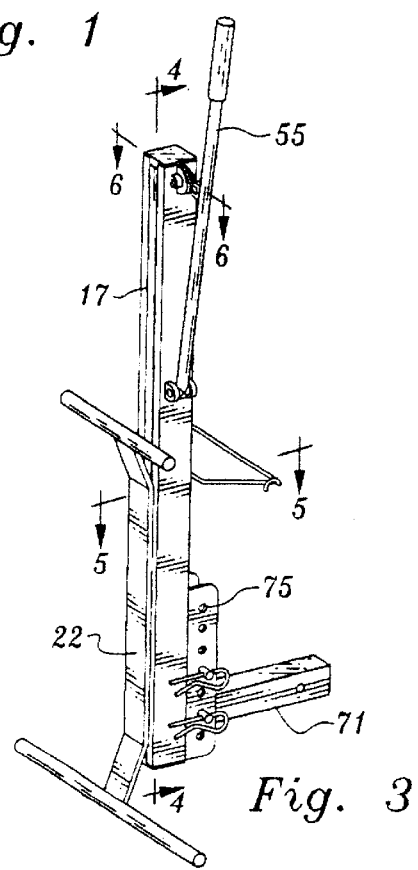
FIG. 3 is a view similar to FIG. 2 with the container engaging mechanism in its fully lowered position.

With reference now to the drawings, and initially to FIGS. 1 and 2, a transporter 15 is shown. In FIG. 1 particularly, the transporter 15 is shown in its working environment, wherein it is mounted to the frame of a truck T, in the hitch receiver. As will become evident, the transporter is operative with any vehicle and is not limited to a pick up truck. A container C is shown as engaged by the transporter and is in position, off the ground, for transportation to a pick up point.

The truck is equipped with any one of several well known tow packages in common usage. The tow package includes a hitch which fits to the frame of the vehicle with a female receiver facing rearwardly, all of which is not specifically shown in light of the well known nature of the structure.

The transporter 15, in keeping with the objectives of the invention, comprises an upstanding post 17, which post, as seen in FIGS. 5 and 6, defines a pair of parallel tracks 19 and 20. The tracks 19 and 20 are internally disposed in the post, with a slot 18 separating them. In this manner the tracks are not reachable by fingers or the like and do not pose a hazard to humans whose curiosity might otherwise get the better of them.

Figure 8:
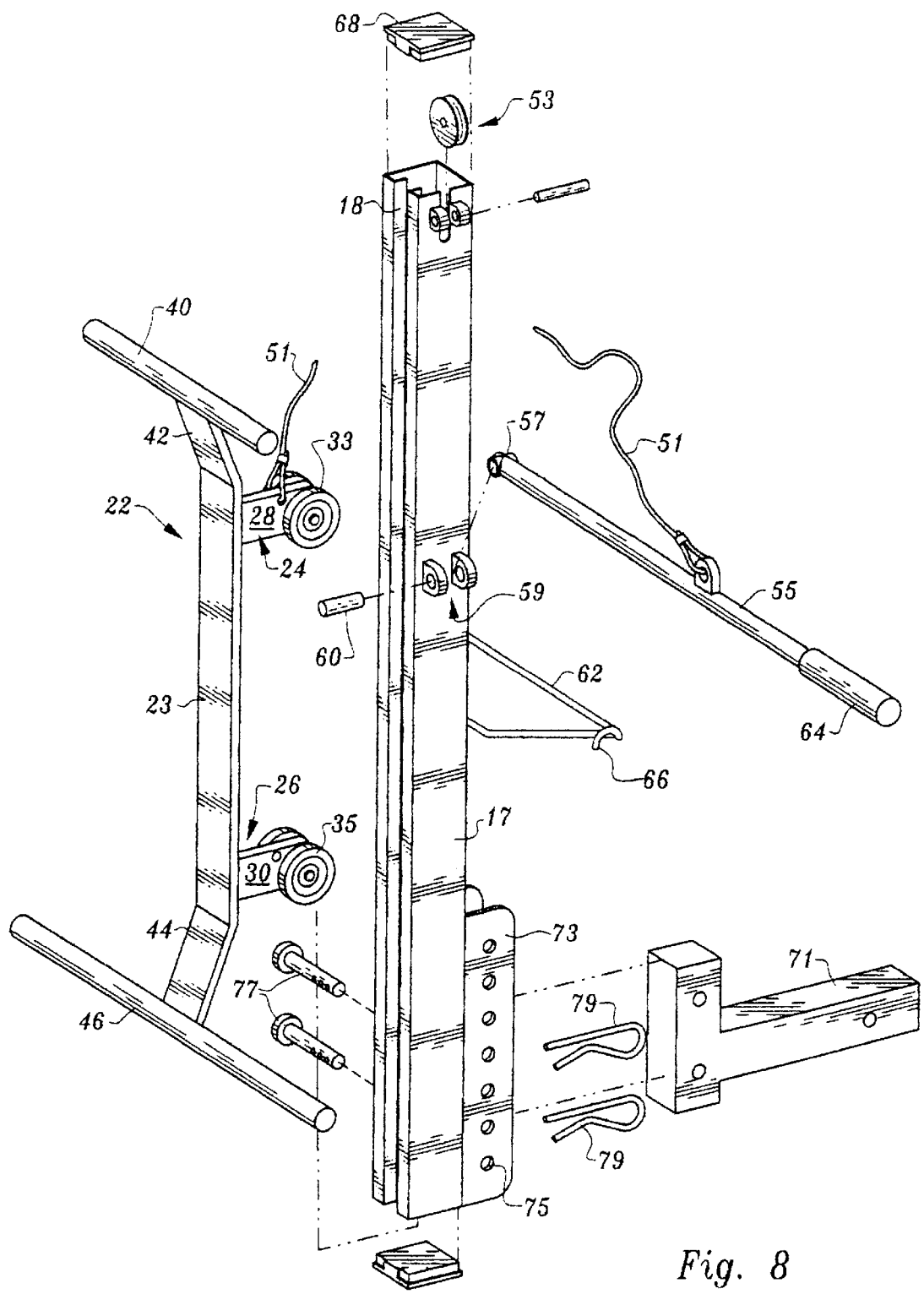
FIG. 8 is an exploded view of the device of the present invention, illustrating in some detail the interrelationship of the various parts.

A lifter 22, best seen in FIG. 8, which includes a longitudinal frame member in the form of a spine 23, is provided, which is supported in the tracks 19 and 20 by an upper truck 24 and a lower truck 26, welded or otherwise secured to the spine 23. Each truck includes a transversely extending axle housing 28 and 30, respectively, which supports guide wheels 33 and 35. The axle housings extend through the slot 18, so that the wheels are disposed inside the post and ride in the tracks.

The lifter 22 is fashioned to fit and engage, in a secure manner, any one of several container configurations and, to that end, is fitted with a transverse lift bar 40, extending outwardly from the upper end 42 of the spine 23. The lift bar, as shown, is circular in cross section, although it may be rectangular without departure from the invention. The lift bar is constructed to fit a deformation in the container C, made for that purpose.

At the lower end 44 of the spine 23 is a lateral support 46. The lateral support 46 and the lift bar 40 are preferably coplaner, and are constructed to lift and hold the container during transportation. The container rests against the lateral support 46 during transportation, thereby stabilizing the container as it is moved across uneven terrain and inhibiting any tendency to break loose from the lift bar.

In order to easily and safely engage and raise the container C for transportation, a cable 51 is provided, one end of which is fastened to the axle housing 28 in any suitable fashion. The cable 51 extends upwardly within the post 17 and about a guide pulley 53.

The cable 51 is, at its remote end, tied to a lift handle 55, which is elongated and provides, in conjunction with the pulley, a mechanical advantage which assists in easing the work necessary to lift very heavy containers. The terminus 57 of the handle is held in a bracket 59 by a pin 60, such that the handle is movable about the pin 60 in an up and down direction to simultaneously move the lifter up and down. A handle hold down bracket 62 receives the grip end 64 of the handle in a notch 66, made for that purpose. Thus, when the handle is pulled down to lift the lifter and associated container, the handle can be held in that position by the bracket 62 during transportation.

It will be appreciated that with the cable and lifter trucks disposed within the confines of the post, there is very little likelihood of inadvertent injury during use. Moreover, caps 68 fit over the top and bottom ends of the post, closing off the interior from dirt and wayward fingers.

The transporter 15 is selectively connectable to any hitch, and, to that end, a transverse tongue 71 is fitted to the post by bracket 73. The bracket has several holes 75 serially spaced along its longitudinal axis to thereby permit adjustment of the height of the transporter for any given vehicle, and pins 77 are inserted through companion holes in the tongue member and are secured by cotter keys 79.

Having now described a preferred embodiment of the present invention, what is claimed is:

1. A container transporter adapted to be received in the hitch of a tow package on a vehicle;

said transporter including an upstanding post; said post defining at least one track therewithin;

a lifter, said lifter being supported on said post for movement longitudinally thereof to raise and lower a container thereon;

an upper truck, a lower truck, said trucks being disposed within said post and attached to said lifter, each said truck having wheels, said wheels riding in said track within said post;

a cable, said cable being disposed partially within said post, and attached to one of said trucks;

a lift handle, said lift handle attached to the exterior of said post for rotational movement in the plane of said post, the other end of said cable being attached to said handle such that rotation of said lift handle to a lowered position causes raising of said lifter;

said lifter being constructed to engage a container to secure the same during transportation.

2. The container transporter of claim 1, wherein two tracks are provided, said tracks being parallel.

3. The container transporter of claim 1, wherein a hold down bracket is provided, said hold down bracket being adjacent to said handle, and said handle being engageable by said hold down bracket when said handle is in its lowered position.

4. The container transporter of claim 1, wherein a pulley is provided, said cable being disposed about said pulley, and said pulley being mounted within said post near the top thereof.

5. The container transporter of claim 1 wherein said lifter is provided with an upper lateral support and a lower lateral support, said lateral supports adapted to engage a container.

* * * * *